US008634771B2

(12) United States Patent
Hassan et al.

(10) Patent No.: US 8,634,771 B2
(45) Date of Patent: Jan. 21, 2014

(54) SIMPLE PEER-TO-PEER NETWORK FORMATION

(75) Inventors: Amer A. Hassan, Kirkland, WA (US); Mitesh K. Desai, Redmond, WA (US); Mukund Sankaranarayan, Sammamish, WA (US); Henrique Filgueiras, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 299 days.

(21) Appl. No.: 13/161,313

(22) Filed: Jun. 15, 2011

(65) Prior Publication Data

US 2012/0322368 A1 Dec. 20, 2012

(51) Int. Cl.
*H04B 5/00* (2006.01)

(52) U.S. Cl.
USPC ........ 455/41.1; 455/41.2; 455/76; 455/414.3; 455/63.1; 455/552.1; 455/410; 370/252; 370/255; 370/338; 370/348

(58) Field of Classification Search
USPC .......... 455/41.1, 41.2, 414.3, 63.1, 76, 552.1, 455/410; 370/252, 255, 338, 348, 395.3
See application file for complete search history.

(56) References Cited

U.S. PATENT DOCUMENTS

| 7,346,344 | B2 * | 3/2008 | Fontaine | 455/418 |
| 7,346,477 | B2 * | 3/2008 | Desai et al. | 702/189 |
| 7,466,810 | B1 * | 12/2008 | Quon et al. | 379/201.01 |
| 7,555,783 | B2 * | 6/2009 | Enright | 726/27 |
| 7,599,304 | B2 * | 10/2009 | Desai et al. | 370/251 |
| 7,616,594 | B2 * | 11/2009 | Roberts et al. | 370/310 |
| 7,783,803 | B2 * | 8/2010 | Roth et al. | 710/106 |
| 7,853,207 | B2 * | 12/2010 | Harada et al. | 455/41.1 |
| 8,099,761 | B2 * | 1/2012 | Ganapathy | 726/2 |
| 8,201,224 | B1 * | 6/2012 | Spertus | 726/4 |
| 8,224,246 | B2 * | 7/2012 | Suumaki et al. | 455/41.1 |
| 8,249,052 | B2 * | 8/2012 | Johnson | 370/351 |
| 8,260,261 | B2 * | 9/2012 | Teague | 455/411 |
| 8,284,739 | B2 * | 10/2012 | Doyle et al. | 370/338 |
| 8,326,958 | B1 * | 12/2012 | Raleigh | 709/223 |
| 8,331,901 | B2 * | 12/2012 | Raleigh | 455/405 |
| 8,355,337 | B2 * | 1/2013 | Raleigh | 370/252 |
| 8,392,957 | B2 * | 3/2013 | Holt et al. | 725/105 |
| 8,411,692 | B2 * | 4/2013 | Patil et al. | 370/401 |
| 8,451,710 | B2 * | 5/2013 | Lee et al. | 370/212 |

(Continued)

OTHER PUBLICATIONS

Devicescape Easy WiFi—Published Date: Mar. 2010 http://devicescape.com/assets/docs/DS_EWF_Overview_4.0.pdf.

(Continued)

*Primary Examiner* — Marceau Milord
(74) *Attorney, Agent, or Firm* — Stolowitz Ford Cowger LLP

(57) ABSTRACT

Wireless devices that support bootstrapping of a peer-to-peer connection. The wireless devices may use an infrastructure mode connection to exchange security information, such as a PIN, used in establishing the peer-to-peer connection. This security information may be encrypted in accordance with a security protocol used by the access point and then may be applied in a security protocol used to establish a peer-to-peer connection. Such a bootstrapping capability supports operating scenarios in which devices that are communicating over an infrastructure network encounter an operation that requires transfer of large amounts of data and automatically transition to a peer-to-peer connection that provides better performance. With these techniques, a computing device may automatically connect to a display device and stream audio/video data to the display.

20 Claims, 7 Drawing Sheets

(56) References Cited

U.S. PATENT DOCUMENTS

| | | |
|---|---|---|
| 2006/0171537 A1 | 8/2006 | Enright |
| 2008/0141347 A1 | 6/2008 | Kostiainen |
| 2009/0011738 A1* | 1/2009 | Sasakura ............. 455/410 |
| 2009/0109897 A1 | 4/2009 | Woo |
| 2009/0158032 A1 | 6/2009 | Costa |
| 2010/0115146 A1 | 5/2010 | Roth |
| 2012/0084364 A1* | 4/2012 | Sivavakeesar ............. 709/205 |
| 2012/0179737 A1* | 7/2012 | Baranov et al. ............. 709/201 |

OTHER PUBLICATIONS

FAQ—What is WPS (Wi-Fi Protected Setup)?—Published Date: Mar. 2008 http://www.edimax.eu/images/Image/FAQ/11n/What%20is%20WPS%20_Wi-Fi%20Protected%20Setup_.pdf.

* cited by examiner

SIMPLE PEER-TO-PEER NETWORK FORMATION

BACKGROUND

Many computers today have radios to support wireless communication. Wireless communication is used, for example, to connect to an access point of a network. By associating with the access point, a wireless computer can access devices on the network or to other networks reachable through that network, such as the Internet. As a result, the wireless computer can exchange data with many other devices, enabling many useful functions.

To enable computers to be configured for association with an access point, it is common for the access points to operate according to a standard. A common standard for devices that connect to access points is called Wi-Fi. This standard was promulgated by the Wi-Fi Alliance, and is widely used in portable computers. There are multiple versions of this standard, but any of them can be used to support connections through access points.

Connections formed through an access point are sometimes called "infrastructure" mode connections because the access point and possibly other infrastructure must be in place to establish the connection. Wireless communications may also be used to form connections directly to other devices without using an access point. These connections are sometimes called "peer-to-peer" connections and may be used, for example, to allow a computer to connect to a mouse or keyboard wirelessly. Wireless communications for these direct connections also have been standardized. A common standard for such wireless communications is called BLUETOOTH®.

In some instances, a wireless computer may concurrently connect to other devices through an access point and as part of a group engaging in peer-to-peer communications. To support such concurrent communication, some computers have multiple radios. More recently a standard has been proposed, called Wi-Fi Direct, that enables both an infrastructure connection and communication as part of a peer-to-peer group with similar wireless communications that can be processed with a single radio. This standard, also published by the Wi-Fi Alliance, extends the popular Wi-Fi communications standard for infrastructure-based communications to support direct connections to devices.

Such direct connections may be formed among groups of devices. In accordance with the Wi-Fi Direct standard, devices that wish to communicate may exchange messages, formatted as action frames, to form a Group. A Group is then a collection of devices with one device declared (through the peer-to-peer protocol) as Group Owner. Initially forming a group may require user input, such as to enter a PIN or other information that serves to authorize devices to connect with one another. This process of forming an initial connection is sometimes called "pairing." In accordance with the Wi-Fi Direct standard, pairing may include performing an exchange of massages in accordance with a Wi-Fi Protected Setup (WPS) protocol.

SUMMARY

An enhanced user experience is provided through a simplified pairing process for wireless devices to form a peer-to-peer connection. Pairing is made possible by sharing security information through a wireless access point. The devices may then use this security information to pair, without requiring direct user input as part of the paring process.

The ability to form a peer-to-peer connection without direct user input as part of the pairing process can provide functions that enhance the user's experience. The peer-to-peer connection, for example, may be initiated automatically to perform an operation involving a communication channel that has characteristics different than can be supported through an access point. As a specific example, a user of a wireless device may provide input indicating that audio/video data is to be streamed to a remote device. In response, the wireless device may determine that the remote device supports a mode of operation in which pairing can occur without further user input and initiate that pairing. Audio/video data may then be streamed over the peer-to-peer connection, which may support a higher bandwidth, may have more predictable packet latency or other desirable characteristics than can be achieved by communicating through an access point.

Accordingly, in one aspect, the invention relates to a method of operating a wireless device to form a peer-to-peer connection. That method may include forming a connection with an access point and sending a first communication to a remote wireless device through the access point, to request security information associated with the remote wireless device. The wireless device may receive a second communication from the remote wireless device through the access point, the second communication providing security information associated with the remote wireless device. Using this security information, the wireless device may form a peer-to-peer connection with the remote wireless device.

In another aspect, the invention relates to at least one computer-readable storage medium comprising computer-executable instructions for controlling a wireless device that, when executed, form a connection with an access point; discover a remote wireless device; and receive an indication of a capability of the remote wireless device to support exchange of security information through the access point. The computer-executable instructions may control the wireless device to conditionally form a peer-to-peer connection with the remote wireless device based on the capability of the remote wireless device, by, when the remote wireless device has the capability to support the exchange of security information, receiving security information through the access point and forming the peer-to-peer connection based on the received security information. When the remote wireless device does not have the capability to support the exchange of security information through the access point, the connection may be formed by receiving security information via user input. Regardless of how the security information is received, it may be used to form the peer-to-peer connection.

In yet a further aspect, the invention may relate to a device that has at least one radio and at least one processor for controlling the radio. With such a configuration, the device may form a connection with an access point, provide security information to a computing device through the access point, and form a peer-to-peer connection with the computing device based on the security information.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

The Inventors have recognized and appreciated that growing availability of devices that support peer-to-peer connections will enable many scenarios in which networked computers provide new or more useful services to a user. However, there will likely be obstacles that prevent users from achieving the full advantage of these connections. For example, users may not know that forming such peer-to-peer connections will be desirable in certain situations. Users might not know how to form such connections or may not be willing to take the extra steps needed to form those connections.

The Inventors have further recognized and appreciated that scenarios in which peer-to-peer connections may be useful may occur even between devices that are coupled through an access point. The Inventors have also recognized and appreciated that the connection through the access point can be used to exchange security information used in pairing in accordance with a peer-to-peer protocol as a way to "bootstrap" a peer-to peer connection. As a result, a wireless device may be programmed to provide behaviors that a user may perceive as desirable, even without express user programming.

For example, the wireless device may determine that a requested operation involving wireless communication would provide a better user experience if that wireless communication were conducted over a peer-to-peer connection rather than through an access point to an infrastructure network. Such a determination may be based on factors such as the nature of the operation, the quantity of the data to be conveyed, the rate of data transmission, impact of unpredictable latency on the operation and/or current performance of the infrastructure network. As a specific example, such a connection may be useful for streaming data at a relatively high rate, such as may occur when a computing device streams audio/video data to a remote device for display.

When the wireless device determines that the user experience will be enhanced or other benefits may be achieved through the use of a peer-to-peer connection, the wireless device may then attempt to form such a peer-to-peer connection automatically. This connection may be formed without requiring the user to supply security information used in the pairing process or providing other input. Rather, this information may be exchanged through an access point, with which each of the devices may already be connected as part of an infrastructure network. The exchange may rely on the security techniques already in place for communication through the wireless access point. As a result, the user experiences higher performance for the operation, but without a need to take actions to direct the formation of a peer-to-peer connection or to supply security information.

Figure 1A:
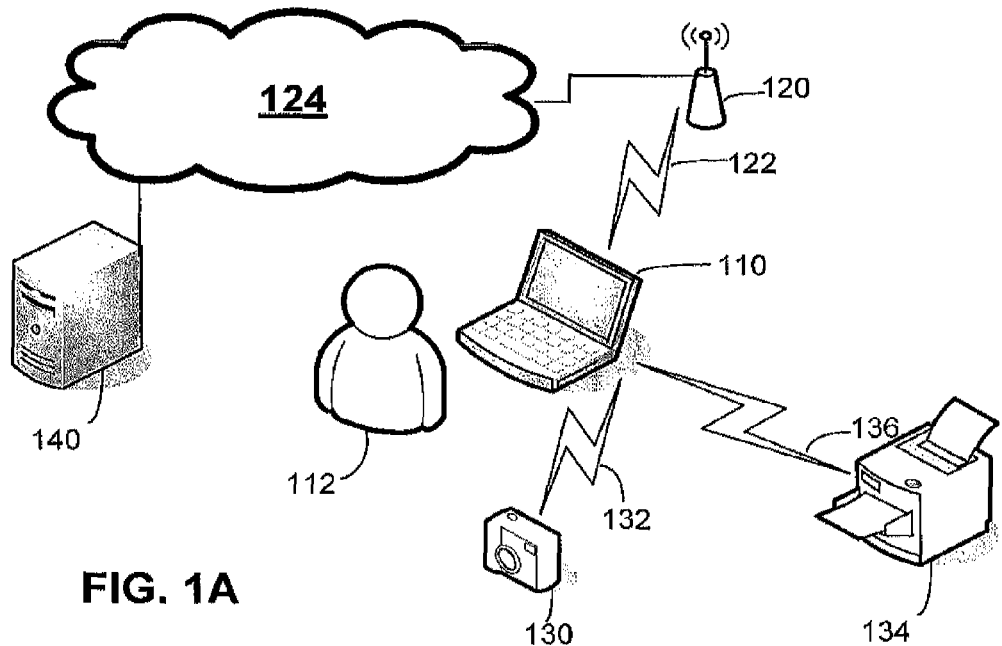
FIG. 1A is a sketch of an exemplary environment in which embodiments of the invention may be practiced.

The forgoing techniques may be used alone or together in any suitable combination in any suitable environment. FIG. 1A illustrates an environment in which a plurality of wireless devices may form a peer-to-peer group. As an example of a peer-to-peer group, devices operating in accordance with a Wi-Fi Direct protocol are described herein. However, it should be appreciated that any suitable peer-to-peer protocol may be used.

In the example of FIG. 1A, computing device 110 is illustrated as a laptop computer. Though, it should be appreciated that the form factor of computing device 110 is not a limitation on the invention. Computing devices configured as tablets, SmartPhones or with any other suitable form factor may be configured and operated according to embodiments of the invention. Moreover, it should be appreciated that any wireless device may play any role in a peer-to-peer group. Accordingly, it is not a requirement that any of the devices in the group be a computing device.

FIG. 1A illustrates that computing device 110 is being operated by user 112. User 112 may interact with computing device 110 using techniques as are known in the art to control computing device 110 to wirelessly connect with other devices.

In this example, FIG. 1A illustrates peer-to-peer wireless connections. Computing device 110 is shown to have connections 132 and 136 to camera 130 and printer 134, respectively. In this case, camera 130 and printer 134 are examples of wireless devices with which computing device 110 may connect in order to exchange data.

Camera 130, printer 134 and computing device 110 may communicate over wireless connections 132 and 136 using a peer-to-peer protocol that supports persistent groups. In this example, camera 130, printer 134 and computing device 110 may form a persistent group according to a peer-to-peer protocol. Though, in alternative embodiments, computing device 110 may form a first group with camera 130 and a second group with printer 134. Accordingly, it should be appreciated that a group may be made up of any suitable number of devices, including only two devices.

Wireless connections 132 and 136 may be formed according to any suitable peer-to-peer protocol. In this example, connections 132 and 136 are formed using an extension of the Wi-Fi protocol, referred to as Wi-Fi Direct. Connections 132 and 136 may be formed through a pairing process. That pairing process may involve the use of security information, such as one or more PINs. Each PIN may be a number or other value associated with one of the wireless devices. A remote device pairing with that wireless device may use the PIN to establish that it is authorized to pair with the wireless device.

The PIN, or other security information, may be used in any suitable way during the pairing process. It is not necessary that the PIN be directly communicated, and frequently it is not. Rather, a first device may use the PIN to perform a cryptographic function on a piece of data supplied by a second device. When this processed data is returned to the second device, the second device can determine whether the processed data was generated using the PIN, which validates that the first device had access to the PIN. A known technique for validating a device in this way is called Wi-Fi Protected Set-up (WPS). Though, any suitable technique for validating one device to another may be used.

In the embodiment illustrated, computing device 110 may initiate peer-to-peer connections with remote devices, such as camera 130 and printer 134. In this example, computing device 110 may be a group owner and camera 130 and printer 134 may be clients. In the examples used herein, the PIN is owned by the client but must be available to the group owner to complete the pairing process. Though, it should be recognized that the specific device that owns the PIN is not a requirement of the invention. Moreover, it should be appreciated that only one of the devices is described as owning a PIN, but each could own a PIN and require the other device to have access to that PIN to complete the pairing process.

In this case, the PIN used for forming those connections may be supplied by user 112. User 112, for example, may obtain the PIN for each device from an instruction manual or other literature accompanying each device or in any other suitable way. Regardless of how user 112 obtains the PINs, user 112 may input those PINs into computing device 110 as computing device 110 is pairing with those remote devices.

Having a group of devices may allow a user of a computing device that is a member of the group to access functionality of other devices in the group. For example, user 112, through computing device 110, may copy digital data representing pictures from camera 130 such that those pictures may be presented on a display of computing device 110. Similarly, user 112, through interactions with computing device 110, may send digital data representing an item to print to printer 134. Having both camera 130 and 134 in a group with computing device 110 allows user 112 to interact with both camera 130 and printer 134. Having these devices in a group may also allow data to be conveyed from camera 130 to printer 134 such that a user of camera 130 may cause pictures to be printed at printer 134.

In this example, computing device 110 also has a wireless connection through access point 120 to network 124. Wireless connection 122 through access point 120 is an example of an infrastructure type connection. Any suitable technique may be used to form wireless connection 122, including techniques that employ known infrastructure type protocols. As one example, wireless connection 122 may be formed using a protocol sometimes called "Wi-Fi." Though, the specific protocol used is not critical to the invention.

In the example illustrated, computing device 110 has the role of a station in wireless connection 122. The role of the computing device 110 indicates the specific steps of the wireless protocol performed by computing device 110 in order to exchange information with access point 120.

Network 124 may be a home network, an enterprise network, the Internet or any other suitable network. However, in the embodiment illustrated, network 124 may be a local area network, allowing computing device 110 to access computing devices, such as server 140 that is also connected to network 124. As a result, network 124 may be used instead of peer-to-peer connections to exchange information with nearby devices. Though, in some embodiments, a wireless device may selectively communicate with a remote device through the access point or through the use of a peer-to-peer connection.

Figure 1B:
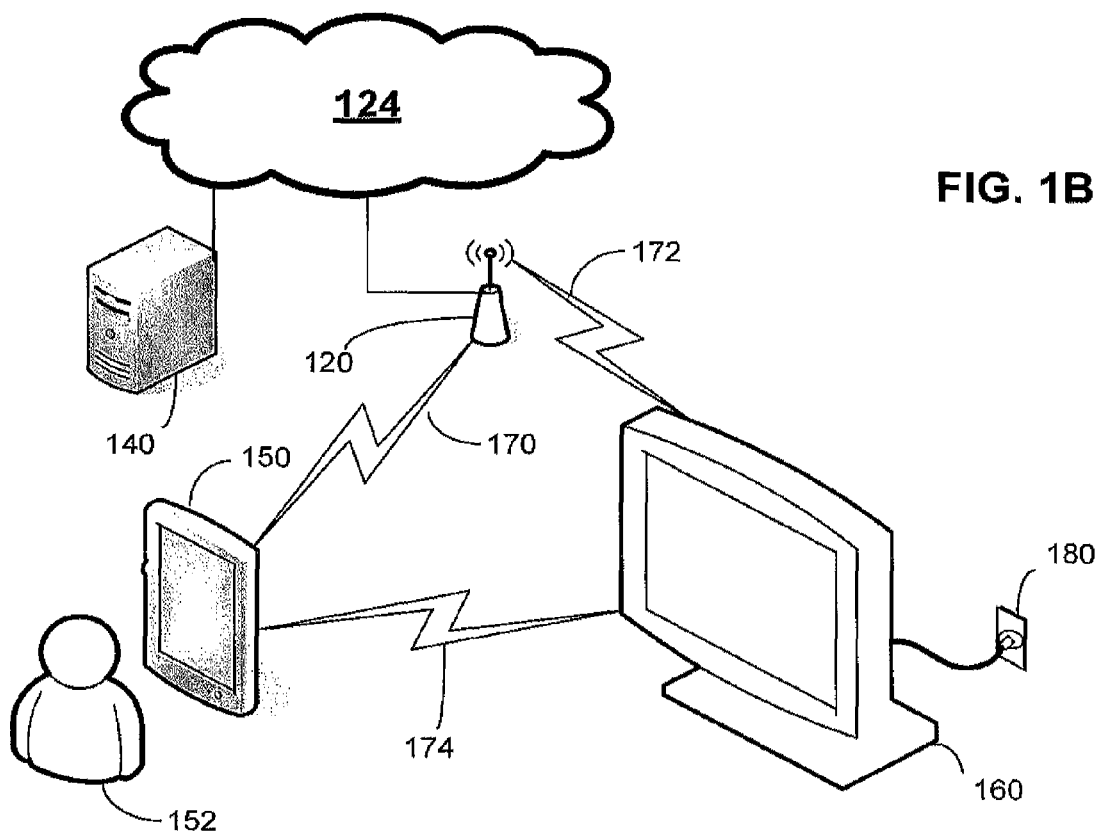
FIG. 1B is a sketch of an environment in which a peer-to-peer connection may be bootstrapped based on communications through an access point.

In the scenario illustrated in FIG. 1B, computing device 150 may form a connection 170 through access point 120. Other wireless devices may also connect to access point 120 such that computing device 150 may communicate with those wireless devices using the infrastructure of network 124. In the example illustrated in FIG. 1B, display 160 is such a wireless device, having established a connection 172 to access point 120. In this way, computing device 150 may communicate with display 160 through access point 120.

For example, computing device 150 may be programmed to act as a media controller using techniques as are known in the art. Accordingly, computing device 150 may receive input from user 152, directing computing device 150 to stream audio/video data to display 160. Display 160, for example, may be a television or other suitable component capable of rendering audio/video data.

In scenarios in which computing device 150 and display 160 are both connected to access point 120, that stream of audio/video data may be communicated through access point 120 using connections 170 and 172. However, in some embodiments, communication characteristics of network 124 may lead to an undesirable user experience when audio/video data is communicated in this way. Audio/video data is an example of a type of data for which characteristics of a communications channel used to communicate that data may impact a user's perception of an operation involving display of that data. For example, if the communication channel does not provide sufficient bandwidth to support the full stream of data, some of the data may be lost, resulting in video data being presented on display 160 with a grainy appearance. As another example, if the communication channel formed by connections 170 and 172 have variable latency, the video rendered on display 160 may appear jumpy.

In some scenarios, a direct, peer-to-peer connection between computing device 150 and display 160 may provide channel characteristics that better support transmission of a stream of audio/video data. As a result, a peer-to-peer connection, such as a connection 174, when used to stream audio/video data from computing device 150 to display 160 may provide a better experience for user 152. The peer-to-peer connection 174 may be formed based on user input. For example, user 152 could provide input to computing device 150, directing computing device 150 to pair with display 160. As part of that pairing, user 152 could also provide a PIN or other security information. Further, user 152 may provide input reconfiguring computing device 150 to use peer-to-peer connection 174 to stream audio/video data to complete an operation commanded by user 152 involving rendering such audio/video data through display 160. However, for user 152 to take those steps, user 152 would first need to recognize that a better user experience could be obtained by forming such a peer-to-peer connection. The user would further need to know how to establish such a peer-to-peer connection and to configure computing device 150 to use that connection.

In accordance with some embodiments of the invention, computing device 150 and display 160 may be configured to automatically recognize a scenario under which a peer-to-peer connection should be formed and used and alternatively or additionally automatically form that peer-to-peer connection.

These capabilities may be provided by wireless devices that support "bootstrapping" through an infrastructure component such as an access point. Through the use of bootstrapping, one or more of the wireless devices obtains information used in forming a connection without express user input of that information.

Figure 2:
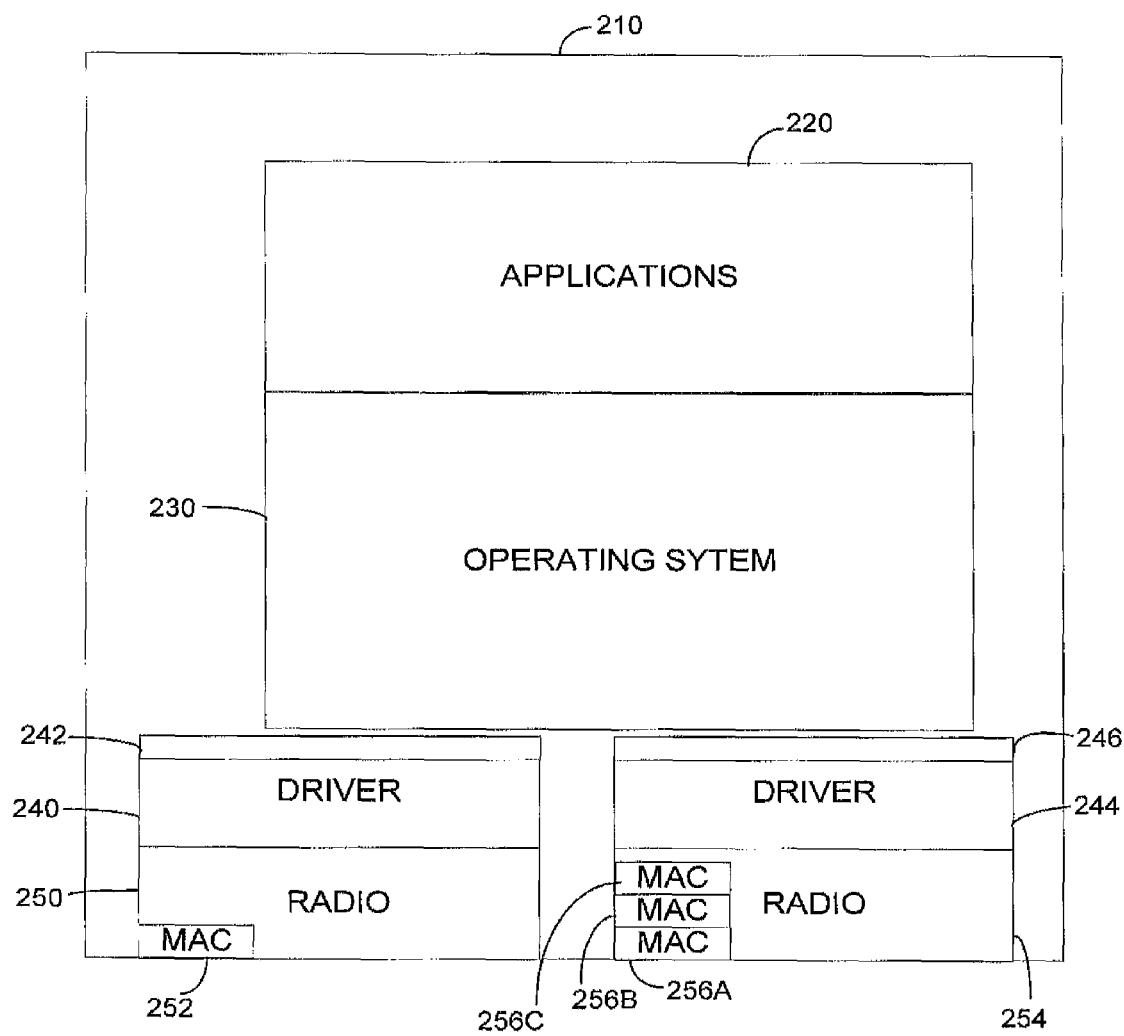
FIG. 2 is a high level block diagram of an exemplary computing device adapted for wireless communication.

Wireless devices operating according to a peer-to-peer wireless protocol that supports bootstrapping through an infrastructure component may be implemented in any suitable way. The wireless devices may in some embodiments be computing devices configured for wireless communication. An exemplary embodiment is provided in FIG. 2. FIG. 2 illustrates, at a high level, an architecture for computing device 210 that may be operated to form an infrastructure mode wireless connection, such as wireless connections 122, 170 or 172 (FIGS. 1A and 1B) and peer-to-peer wireless connections, such as connections 132,136 or 174 (FIGS. 1A and 1B). In the example of FIG. 2, computing device 210 includes two radios, radio 250 and radio 254. Each of the radios may be adapted to send and receive wireless communications. Radio 250, for example, may be used to form wireless connection 122. Radio 254, for example, may be used to form peer-to-peer connections 132 and 136.

In this example, radio 250 has a media access control (MAC) address 252. The MAC address may be a unique identifier associated with radio 250 such that it may be used to distinguish radio 250 from radio 254 and also from radios in any other devices with which computing device 210 may communicate. Accordingly, the MAC address 252 may be included in packets sent by radio 250 to indicate that the frame was sent by radio 250 or may be included in packets directed to radio 250 to indicate that a frame is intended for radio 250.

MAC address 252 may be assigned to radio 250 in any suitable way. It maybe assigned, for example, by the manufacturer of radio 250. Though, in some embodiments, MAC address 252 may be assigned by operating system 230 or another component of computing device 210 or by some other component in a system in which computing device 210 is operating.

Radio 250 may be controlled through software, represented as driver 240 in FIG. 2. Here, driver 240 includes an interface 242 through which operating system 230 may issue commands to driver 240 and through which driver 240 may report status and notify operating system 230 of received data. Interface 242 may be implemented in any suitable way, including according to a known standard. An example of such a known standard is called NDIS, but that standard is not critical to the invention.

Interface 242 may support a number of commands in a format that does not depend on the construction of radio 250. Rather, driver 240 may translate the commands, in the standardized format of interface 242, into specific control signals that are applied to radio 250. Additionally, driver 240 may be programmed to perform certain low level functions associated with a wireless connection. For example, upon receipt of a packet, driver 240 may check that the packet is properly formatted. If the packet is properly formatted, driver 240 may control radio 250 to generate an acknowledgement. Conversely, if the packet is not properly formatted, driver 240 may control radio 250 to transmit a negative acknowledgement.

Though driver 240, and in some instances radio 250, may automatically perform low level functions associated with establishing and maintaining a wireless connection, higher level functions may be performed under control of operating system 230 or applications 220. In some embodiments, an application 220 or operating system 230 may provide a user interface such that ultimate control of wireless communication is provided by a user of computing device 210.

In the embodiment illustrated in FIG. 2, computing device 210 also includes a radio 254. While radio 250 may be used, for example, for a connection to an infrastructure network, radio 254 may be used to form one or more peer-to-peer connections, such as connections 132 and 136.

Radio 254 is incorporated into computing device 210 with generally the same architecture as radio 250. Radio 254 is associated with a driver 244 that provides a mechanism for operating system 230 to control radio 254. Driver 244 has an interface 246 through which operating system 230 may send commands to driver 244 and driver 244 may provide status to operating system 230. Interface 246, like interface 242, may be a standardized interface such that operating system 230 may communicate with driver 244 using a similar set of commands as are used to control driver 240. Though, because radio 254 is used to implement peer-to-peer connections, driver 244 may respond to different or additional commands than driver 240 in order to implement functions associated with peer-to-peer communications that do not exist for infrastructure based communications.

As an additional difference between radios 250 and 254, radio 254 is illustrated as having multiple MAC addresses. In contrast, radio 250 includes a single MAC address 252. Here, MAC addresses 256A, 256B and 256C are illustrated. Multiple MAC addresses, for example, may be assigned by a manufacturer of radio 254 or the MAC addresses may be assigned in any suitable way, including as described above in connection MAC address 252. Alternatively, one or more of the MAC addresses may be assigned based on an identifier of the user of computing device 210.

Having multiple MAC addresses allows radio 254 to appear to devices external to computing device 210 as multiple entities, each with a separate MAC address. As an example, if computing device 210 is separately communicating as a group owner in a first peer-to-peer group and as a client in a second peer-to-peer group, separate entities may be established for the group owner and the client. Devices external to computing device 210 may address packets intended to be processed by computing device 210 as a group owner in the first group with a first MAC address. Packets intended to be processed as a client in the second group may be addressed with a second MAC address. Similarly, computing device 210 may insert the first MAC address in packets coming from the group owner; packets from the client may include the second MAC address.

To allow operating system 230 to associate its interactions with driver 244 with a specific one of those entities, internal to computing device 210, each of the entities may be represented as a port. Accordingly, operating system 230 may send commands to or receive status information from each such entity through a port associated with that entity.

Each of the ports may be configured to perform functions appropriate for the type of entity the port represents. An embodiment in which computing device 210 operates according to a Wi-Fi Direct, which is used herein as an example of a peer-to-peer protocol, a device that is part of a peer-to-peer group may take on a role of a group owner or a client. A group owner may be required in accordance with a wireless protocol to send certain types of action frames and respond to other types of action frames in specified ways. A device configured as a client may send different action frames and responses or may send the same action frames and responses in different contexts.

Though, it should be appreciated that a group owner and a client are just two examples of the roles that radio 254 and driver 244 may be configured to perform. As another example, an entity may be configured as neither a group owner nor a client. Rather, an entity may be assigned a role as a controller that manages interactions with other devices to form a group and determine the role of computing device 210 in that group.

Though FIG. 2 illustrates separate radios, radio 250 and radio 254, in embodiments in which infrastructure connections and peer-to-peer communications operate using the same frequency channels, a single radio may be used. In such an embodiment, entities performing roles associated with infrastructure communication and entities performing roles associated with peer-to-peer communications may be implemented with the same radio.

Figure 3:
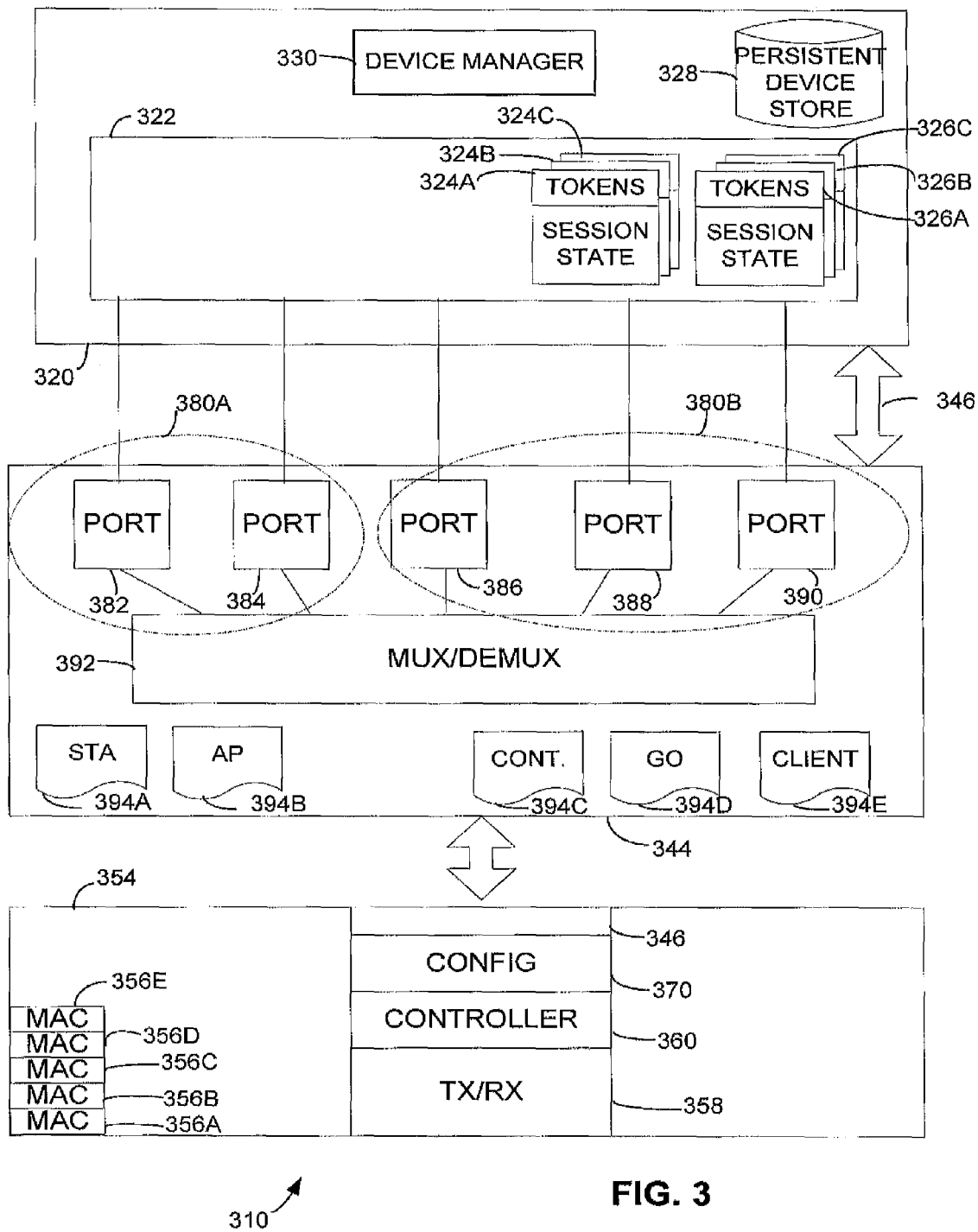
FIG. 3 is a more detailed block diagram of an exemplary computing device adapted for wireless communications.

FIG. 3 illustrates an embodiment in which a computing device 310 is configured to support, using a single radio, both entities that have a role in an infrastructure network and entities that have a role for peer-to-peer communication. FIG. 3 illustrates computing device 310 containing a radio 354. Radio 354 is illustrated as having multiple MAC addresses, illustrated as MAC addresses 356A, 356B, 356C, 356D and 356E. Though five MAC addresses are illustrated, which may allow radio 354 and its associated driver 344 to concurrently provide five ports, it should be appreciated that the specific number of MAC addresses supported is not critical to the invention and more or less than five MAC addresses may be used in some embodiments.

In this example, the five MAC addresses may be used to provide five ports 382, 384, 386, 388 and 390, each configured to perform a different role. In the scenario illustrated, a group 380A of these ports has been configured to implement entities used for infrastructure based communications. Group 380B contains ports configured for peer-to-peer communications.

In the example illustrated in FIG. 3, group 380A contains two ports, ports 382 and 384. Group 380B is shown containing three ports, ports 386, 388 and 390. It should be appreciated that the number of ports allocated for each type of use is not critical to the invention and any suitable number may be used. Moreover, it is not a requirement that the number of ports in each group remain static. Rather, operating system 320 may issue commands to driver 344 to dynamically create or break down ports as needed.

In conjunction with a command to create a port, operating system 320 may specify a role associated with that port. Driver 344 may respond to such a command by creating a port configured for a designated role, which may be associated with infrastructure-based communications or with peer-to-peer communications. Though operating system 230 may specify a role, the role specified may be determined in any suitable way. For example, when forming a peer-to-peer group, operating system 320 may determine the role by controlling computing device 310 to wirelessly exchange messages with other devices in the group to collectively negotiate a role for each device.

Though any suitable mechanism may be used to implement a capability to assign a role to computing device 310, FIG. 3 illustrates an interface 346 between operating system 320 and driver 344. Interface 346 may be an interface to a driver in a standardized format. As one example, some drivers are written in accordance with the NDIS interface specification. In accordance with that specification, commands and status information may be exchanged between driver 344 and operating system 320 using programming objects called OIDs. The NDIS standard defines a number of OIDs that drivers should or may respond to. The standard, though, is extensible such that OIDs may be defined to support additional functionality in certain circumstances. This extensibility may be used to define commands, using OIDs or other suitable representation, that allows operating system 320 to command driver 344 to create or break down a port or to configure a port for a specific role.

Though radio 354 can process packets for multiple ports, other than supporting multiple MAC addresses, radio 354, in some embodiments, need not be specially configured for supporting ports. Radio 354 may be implemented using techniques as are known in the art. In this example, transmitter/receiver section 358 may be a hardware component as is known in the art and used for wireless communications. In this example in which radio 354 is being used to support communications in accordance with the Wi-Fi infrastructure-mode protocol and the Wi-Fi direct protocol for peer-to-peer communications, transmitter/receiver section 358 may support communications in multiple subchannels over a frequency range defined by the Wi-Fi specification. Though, the specific operating characteristics of transmitter/receiver section 358 may vary depending on the specific protocol implemented for communication and are not critical to the invention. Likewise, controller 360 may be a hardware component as is known in the art of wireless radio design. Similarly, configuration register 370 may be a hardware component as is known in the art of wireless radio design. The components indicated as MAC address 356A . . . 356E may also be implemented using techniques as are known in the art. In some embodiments, the MAC addresses supported by radio 354 may be encoded in a read only memory or other component that is a portion of radio 354. Though, it should be appreciated that, in embodiments in which MAC addresses are assigned to radio 354 through driver 344, MAC addresses 356A . . . 356E may be physically implemented in either volatile or non-volatile rewriteable memory such that the pool of MAC addresses to which radio 354 can respond may be dynamically created.

Regardless of the manner in which the components of radio 354 are implemented, radio 354 may contain a hardware interface 346 through which driver 344 may control radio 354. In some embodiments, driver 344 may be computer executable software instructions executing on a processor within computing device 310. Accordingly, hardware interface 346 may be implemented as a bus connection or other suitable interconnection between the processor executing driver 344 and a separate card holding radio 354. Though such hardware interfaces are known in the art, any suitable interface may be used.

To configure radio 354 to support a port, driver 344 may configure radio 354 to process packets for a specific MAC address associated with communications through that port. Driver 344 may write a value into configuration register 370 indicating that a MAC address should be activated such that radio 354 will process received packets identified with that MAC address. In operation, controller 360 may control transmitter/receiver section 358 to respond to any packets identified with a MAC address identified as active by information in configuration register 370. Accordingly, if multiple ports are active, configuration register 370 will contain an indication of each of the active MAC addresses.

In addition to configuring radio 354 to respond to a MAC address for a port, driver 344 may specify communications parameters to be used with that MAC address. These parameters may specify, for example, that a different number of subchannels may be used for communication with different MAC addresses. In this way, communication characteristics of different ports may be controlled based on the role associated with the port. As a specific example, a port configured as a control port may require lower bandwidth than a port for communicating data. Accordingly, radio 354 may be configured to use fewer subchannels or a different encoding scheme for a MAC address that is associated with a control port.

For information to be transmitted, driver 344 and/or radio 354 may be operated such that any frames transmitted containing such information will be identified by the MAC address associated with the port for which the information is being transmitted. Any suitable mechanism may be used to associate MAC addresses with specific frames sent from or received for a specific port. Moreover, this processing may be performed partially or totally within driver 344 and partially or totally within radio 354 because the specific implementation does not impact functioning of the ports.

To implement multiple ports, driver 344 may also be configured. In this example, driver 344 is illustrated to contain computer executable instructions that implement a multiplexer/demultiplexer 392. Multiplexer/demultiplexer 392 operates to route received packets associated with a port to a portion of driver 344 that implements the functionality of the respective port. Conversely, multiplexer/demultiplexer 392 receives packets for transmission from any of the ports and routes those packets to radio 354.

In scenarios in which multiple ports simultaneously have information for transmission, multiplexer/demultiplexer 392 may mediate to establish the order in which radio 354 receives information from the ports. For this purpose, multiplexer/demultiplexer 392 may use any suitable policy. For example, packets carrying action frames may be given priority over packets with data frames. As another example of a policy, transmissions associated with ports operating in infrastructure mode may be given priority over ports operating in peer-to-peer mode. As yet another example, a port configured for the role of group owner may be given priority over a port configured for the role of client in a peer-to-peer group. Though, the specific policies applied by multiplexer/demultiplexer 392 are not critical to the invention, and any suitable policies may be employed.

In addition to configuring multiplexer/demultiplexer 392 to route packets, driver 344 may be configured by associating specific functional modules with each of the ports. The specific functional module associated with the port may be based on the role assigned to that port. For example, FIG. 3 illustrates five functional modules. Functional module 394A, when associated with a port, may configure that port to operate in the role of a station in an infrastructure network. Similarly, functional module 394B, when associated with a port, may configure that port for the role of an access point in an infrastructure network. Functional module 394C, when associated with a port, may configure that port for operating in the role of a controller in peer-to-peer mode. The controller, for example, may control communications as the device negotiates or renegotiates a role in a peer-to-peer group. Functional module 394D, when associated with a port, may configure that port for the role of group owner in a peer-to-peer group. Functional module 394E, when associated with a port, may configure that port for the role of client in a peer-to-peer group. Other functional modules, though not illustrated in FIG. 3, may alternatively or additionally be included.

Functional modules 394A . . . 394E may be implemented in any suitable way. For example, each of the functional modules may be implemented as a collection of computer executable instructions that are encoded to perform functions for the role associated with the functional module. For example, functional module 394A may be encoded with instructions that control radio 354 to transmit packets as appropriate for a station in an infrastructure network. Additionally, functional module 394A may contain instructions that allow driver 344 to interact with operating system 320 in a way that implements the behaviors of a station in an infrastructure network. As a specific example, functional module 394A may be encoded to automatically generate responses to certain received frames. Additionally, functional module 394A may be encoded to transfer data received in a frame to a location in memory on computing device 310 and then notify operating system 320 that data has been received. Further, functional module 394A may configure radio 354 for the role of that functional module. Such configuration may include setting a number of subchannels or other parameters of the wireless communications used in the specified role. The operations performed by functional module 394 may be similar to those performed in a conventional driver for a wireless network interface card configured only as a station in a Wi-Fi network, and functional module 394 may be encoded using techniques as are known in the art.

Each of the other functional modules may be similarly encoded to interact with the operating system 320 and radio 354 to configure radio 354 and to internally process and generate communications as appropriate for its respective role. Functional module 394B, for example, may be encoded with computer executable instructions that perform operations on or respond to received frames with behaviors as are known in the art for an access point in an infrastructure network. Also, functional module 394B may be encoded to interact with operating system 320 using techniques as are known in the art.

Functional module 394C may be encoded to perform functions associated with establishing a peer-to-peer group. The instructions that implement functional module 394C may likewise be written using techniques that are known in the art. Those instructions may cause radio 354 to transmit packets containing action frames or responses to action frames of the type used in establishing a group for peer-to-peer communication according to a specific protocol and that negotiate or renegotiate roles of devices for such a group. Components within operating system 320 may trigger the sending of those action frames. Though, for some action frames, functional module 394C may be configured to generate a response to an action frame without express action by operating system 320. Table 1 lists examples of action frames that functional module 394C may be commanded to send by operating system 320. These action frames represent action frames appropriate for a Wi-Fi Direct protocol. Additional action frames used in that protocol may be sent without an express command in response to a received action frame or other suitable trigger. Though, it should be appreciated that different or additional action frames may be used for different protocols, and the specific action frames is not a limitation on the invention.

TABLE I

| Action Frame | Dialog Token Generated by Driver | Port Remains Available After Successful Transmission For Receiving Replies | Receive Indicated to OS |
| --- | --- | --- | --- |
| GO Negotiation Request | Yes | Yes | Yes |
| GO Negotiation Response | No | Yes if the response indicates that the negotiations were successful, No Otherwise | Yes |
| GO Negotiation Confirmation | No | No | Yes |
| P2P Invitation Request | Yes | Yes | Yes |
| P2P Invitation Response | No | No | Yes |
| Provision Discovery Request | Yes | Yes | Yes |
| Provision Discovery Response | No | No | Yes |

When the operating system 320 submits a request to a control port to send one of the action frames in Table I, functional module 394C within driver 344 may take actions such as:

a. Select a dialog token for the transmission. If the send is in response to a request, the operating system may provide the dialog token (as described below) to be used, and driver 344 may then use the specified dialog token.
b. Complete the request. If driver 344 selected the dialog token, it may report the dialog token to the operating system 320 in the completion of the request.
c. Sync with the Wi-Fi Direct device to which the frame is targeted. Depending on the implementation, if the send is in response to a received request (e.g. Invitation Response sent on reception of an invitation request), this step may be omitted.
d. Send the frame & wait for an ACK.
e. Once the ACK for the frame is received or if none of the retry attempts get an ACK, send a NDIS_STATUS indication to operating system 320 to notify about the transmission status of the action frame. This indication may include the information elements from the packet containing the action frame.

If the send was for a frame that would receive a reply from the peer device and the transmission was successful, the port may remain available for the peer device to send reply action frames to the miniport. The timeout and mechanism of being available may follow the Wi-Fi Peer-To-Peer Technical Specification.

The specific component within operating system 320 that triggers functional module 394C to send action frames when functional module 394C is associated with a port is not critical to the invention. However, FIG. 3 illustrates a device manager 330 within operating system 320. Device manager 330, for example, may be a device manager as is known in the art that may present a user or programmatic interface through which a user or other executing component may request that a communication session be established with a device or a group of devices using peer-to-peer communication.

When a port, such as port 386, is configured to act as a controller for peer-to-peer communication by associating that port with functional module 394C, device manager 330 may interact with port 386 to control various aspects of establishing peer-to-peer communication with one or more devices. For example, device manager 330 may receive user input requesting that computing device 310 be wirelessly connected to a device such as printer 134 (FIG. 1A) or a group of related devices, such as display 160, keyboard 162 and mouse 164 (FIG. 1B). In response to such input, device manager 330 may interact through stack 322 with port 386, causing functional module 394C to control radio 354 to transmit action frames.

The transmitted action frames may be those associated with device or service discovery. Device manager 330 may specify the nature of those requests, such as whether functional module 394C should seek to discover any device in the vicinity of computing device 310 or only devices that provide an identified service, such as a printer service. Though, device manager 330 may be configured to send commands in other formats through port 386 to establish communication with one or more devices in a group.

As an example, FIG. 3 shows that operating system 320 maintains a persistent device store 328. Persistent device store 328 may contain information identifying devices with which computing device 310 has previously established wireless communication. Such information, for example, may constitute persistent group profiles, which may include an identifier used to signal a set of devices to concurrently re-form a group. Device manager 330 may access information in persistent device store 328 to identify specific devices and send commands through port 386 for functional module 394C to generate action frames to establish a wireless connection with a device identified in persistent device store 328. These actions may occur automatically, in response to user input or in response to any other suitable trigger.

In scenarios in which device manager 330 requires information, such as a password or identifier, to establish communication with an external device, device manager 330 may alternatively or additionally interact with a user through a user interface (not expressly shown in FIG. 3) to obtain that information from a user or some other source. That information, which, for example, may be obtained during pairing of computing device 310 to one or more remote devices, may be stored in persistent device store 328. In this way, information obtained from a user, such as during a pairing ceremony with a remote device need not be acquired from the user again to re-establish a peer-to-peer connection with the remote device. Rather, the information may be obtained from persistent device store 328. Though, regardless of the manner in which information input from a user is acquired, when that acquired information needs to be transmitted, device manager 330 may interact with the port configured as a controller to cause that information to be sent.

Regardless of the mechanism that triggers a port configured as a control port, such as port 386, to identify a group of devices, the control port may send and receive action frames to identify one or more devices that form a group including computing device 310. The actions initiated through port 386, in addition to identifying the group, may negotiate a role for computing device 310 within that group. In the illustrated example of the Wi-Fi Direct peer-to-peer protocol, a device may have a role in a group as the group owner or as a client. Communication with another device or devices in the identified group may be performed through a different port. That port may be configured to support behavior in the role identified for computing device 310.

In the example illustrated in FIG. 3, additional ports 388 and 390 are illustrated. Each of these ports may be associated with a different role. For example, port 388 may be associated with the role of group owner. Port 390 may be associated with the role of client. Configuring a port for a different role may be performed by associating the port with the functional module that performs operations associated with the role. For example, functional module 394D, which performs functions associated with a device operating as a group owner, may be associated with port 388. Likewise, functional module 394E, which performs functions associated with the device operating as a client, may be associated with port 390.

In operation, as packets are received through radio 354 having MAC addresses associated with ports 388 or 390, multiplexer/demultiplexer 392 will route those packets for processing within the associated port. Packets routed to port 388 may be processed by functional module 394D, which may perform actions associated with the role of a group owner. Packets containing data frames may be processed by placing the data in memory and notifying stack 322 that data has been received. Such an interaction with operating system 320 may use stack signaling techniques as are known in the art. Though the specific mechanism by which communication between each port and operating system 320 occurs is not critical to the invention.

When action frames are sent as part of a session established with a group in which computing device 310 is the group owner, those action frames may likewise be routed by multiplexer/demultiplexer 392 to port 388. Functional module 394C may be configured to either respond to those action frames or may be configured to report the action frames to operating system 320 depending on whether functional module 394C is programmed to respond to them.

Similarly, if computing device 310 is configured for the role of a client in a group, packets relating to communication with devices in that group will be identified with a MAC address that causes multiplexer/demultiplexer 392 to route those packets to a port configured as a client, such as port 390. Port 390 may be associated with functional module 394E, implementing functionality of a client according to a peer-to-peer protocol. Functional module 394E may be configured to transfer data from data frames in such packets to memory and notify operating system 320 of that data, using techniques as are known in the art. Functional module 394E may respond to packets containing action frames or may notify operating system 320 of those management frames.

Functional modules 394C, 394D and 394E may be coded to implement functions prescribed in accordance with a peer-to-peer protocol, such as Wi-Fi Direct protocol. Additionally, functions performed by a device operating in accordance with the peer-to-peer protocol may include detecting a remote device with which a persistent peer-to-peer group was previously formed. Upon detecting such a remote device, functions performed by the device may include establishing communication with that remote device based on previously stored persistent profile information. These functions may be implemented by appropriately configuring functional module 394C. Though, any suitable implementation may be used.

FIG. 3 illustrates a specific hierarchy of communication functions. Certain functions relating to communication with external devices are performed within radio 354. Other functions are performed within driver 344. Yet further functions are performed within operating system 320. Though not specifically illustrated, even further functions may be performed by applications 220 (FIG. 2) or by input from a user or source external to computing device 310. With such an architecture, higher level functions, such as determining which devices to connect to as part of a peer-to-peer group, may be performed at higher levels in the architecture. Conversely, lower level functions, such as generating an acknowledgement to a received packet may be performed at lower levels in the architecture. For example, driver 344 may be configured to generate such an acknowledgement. Any of the functions as described herein may be performed by components at any suitable level of the hierarchy.

Though other architectures are possible that may partition the functions differently so that different aspects of communication are controlled by different components, in the example illustrated, radio 354 and driver 344 are configured to respond statelessly to events, such as commands or received packets. To the extent state information is involved in a communication session, that state information may be maintained within operating system 320. For example, stack 322 may maintain state information for communication sessions carried on through any of the ports 382, 384, 386, 388 and 390. The specific state information maintained may depend on the number and types of states within a protocol supported by each of the ports.

In the example of FIG. 3, session state information 324A is shown associated with port 388. Though not expressly illustrated, session state information may be maintained for other ports. Depending on the protocol implemented by port 388, such session state information may indicate parameters of a session, such as a number of devices that are joined in a group for which computing device 310 is the group owner. Other state information, such as a time until those devices may enter a lower power mode, may also be stored as part of the session state information 324.

FIG. 3 additionally shows session state information 324B and 324C associated with port 388. State information 324B and 324C may describe different sessions. Such sessions may arise if computing device 310 is joined in three groups in which it is the group owner. To support multiple such sessions, a mechanism may be provided to associate specific frames sent or received with a corresponding session. Any suitable identifier or identifiers may be used. For example, communications with a group of devices may be regarded as a session, such that an identifier of a group may be used to aggregate related communications as part of a session. Stack 322 provides an interface to device manager 330 or other components that associates each session with the appropriate component that is an end point in that session. Such interfacing may be performed using techniques as are known in the art.

In addition to maintaining state information that allows communications from separate sessions to be presented appropriately, stack 322 may maintain, as part of the state information maintained for each session, information that allows stack 322 to relate communications that are part of an exchange of communications to perform a function. For example, when a frame, representing a request, is sent, recognizing that a subsequently received frame is a response to that request may facilitate processing of the request and response. Providing a mechanism to relate communications that are part of an exchange may facilitate processing, particularly if multiple sessions are supported on the same port. To enable recognition of communications that are part of an exchange, "dialog tokens" may be used. A communication initiating an exchange may be tagged with such a dialog token. Upon responding to such a communication, the dialog token from the request may be copied to the response. Accordingly, a device sending a request may associate a response, or any other communication that is part of the same exchange, with the request. Accordingly, state information 324A may contain dialog tokens associated with ongoing communications involving any device communicating as part of the session.

Dialog tokens may be generated in any suitable way. They may be generated, for example, within the operating system 320. Alternatively, if a packet beginning a dialog is initiated in a port, the port or other component within driver 344 may generate the token. Similarly, if a reply to a packet is generated within a port, such as port 386, 388 or 390, the token may be inserted in the reply by that port. Conversely, if a reply to a packet is initiated in response to a command generated within operating system 320, a component within operating system 320, such as stack 322 may specify the token for inclusion in the reply. Table I indicates, for the listed action frames, whether the dialog token associated with an action frame is generated in the operating system or, if not, in the driver. Though, it should be appreciated that Table I represents only one example of how the functionality of generating a dialog token for a frame may be partitioned, and any suitable partitioning of that function may be used.

Similar session state information 326A, 326B and 326C is shown in connection with port 390. Session state information 326A, 326B and 326C may represent state maintained for each of three sessions, with each session being associated with a group in which computing device 310 is a member with the role of client. As with session state information 324A, 324B and 324C a unique dialog token may be associated with each of the sessions, allowing stack 322 to separate received packets associated with each of the sessions. Likewise, computing device 310 may cause a dialog token to be associated with packets transmitted from computing device 310. The dialog tokens may be used to allow stack 322, or similar processing components on remote devices that receive packets from computing device 310, to associate packets that are part of a multi-packet exchange of information. For example, a second packet sent in reply to a first packet may include the token from the first packet. As a result, when the sender of the first packet receives the second packet, it can associate the first packet and second packet with the same dialog.

With the architecture illustrated in FIG. 3, state information concerning each of the connections may be maintained within operating system 320. As a result, the ports 386, 388 and 390 need not maintain state information. In some embodiments, functional modules, such as functional modules 394C, 394D and 394E that implement the functions of a port do not maintain state information. Rather, each of the functional modules may be encoded to respond to events, such as a command from operating system 320 or a received packet passed on by radio 354. Though, regardless of how this functionality is partitioned, computing device 310 may be controlled to supply functionality associated with multiple entities by establishing and configuring a port to perform the functionality of each entity. As a result, computing device 310, because driver 344 and radio 354 may be configured to support multiple ports, may concurrently operate as different entities. These entities may include entities associated with infrastructure mode communication as well as entity associated with peer-to peer communication.

Regardless of how a computing device is architected, the device may implement functions defined in an infrastructure mode protocol and/or a peer-to-peer protocol. Functions performed by a device operating in accordance with a peer-to-peer protocol may include forming a group of two or more devices for peer-to-peer communication. One aspect of forming a group may include selecting a device of the group to perform functions associated with control of the group. Such functions, for example, may include determining which devices are allowed to join the group, providing an identifier for the group and providing addresses for devices within the group. In the example embodiment described herein, such a device may be a group owner. Other devices that are part of the group may be clients of the group owner.

Another aspect of forming a group may be determining whether the group is to be a persistent group. Whether a group is to be a persistent group may be determined based on information exchanged between devices, or in any suitable way. If the group is persistent, forming a group may entail creating and storing a persistent group profile. In some embodiments, an identifier of a user may be stored in association with the persistent group profile.

During formation of a persistent group, or at any time thereafter, devices in the group may be designated as a set of related devices that should be requested to re-form a group concurrently. The devices to be triggered to concurrently re-join a group may be determined in any suitable way. In some embodiments, a set of devices may be joined in a group because those devices will be used together and therefore may be triggered to concurrently re-form the group. In such an embodiment, the set of devices that is triggered to concurrently re-form a group may be co-extensive with the group. In other embodiments, a set of devices to be triggered to concurrently re-form a group may be a subset of a previously defined group. In such an embodiment, a mechanism may be provided to select devices for that set. Once such a set is selected, the set may be used to re-form a group that contains at least the selected devices. In some embodiments, bootstrapping operations as described herein may be used to initially form a persistent group. To subsequently re-form the persistent group, the bootstrapping operation may be repeated. Though, information from the persistent device store 328 may be used instead.

Devices having an architecture as pictured in FIG. 2 and FIG. 3 may also be used to implement embodiments of the invention in which a peer-to-peer connection is bootstrapped through an infrastructure mode component. For example, a device manager, such as device manager 330, or other operating system component may be used to request and/or supply security information over a connection through an access point or other infrastructure component. Alternatively or additionally, the device manager 330 or other component executing on such a device may detect a scenario under which an operation may be completed using a peer-to-peer connection. In such a scenario, the component may trigger the automatic formation of such a connection and configure the wireless device to use that connection.

Figure 4:
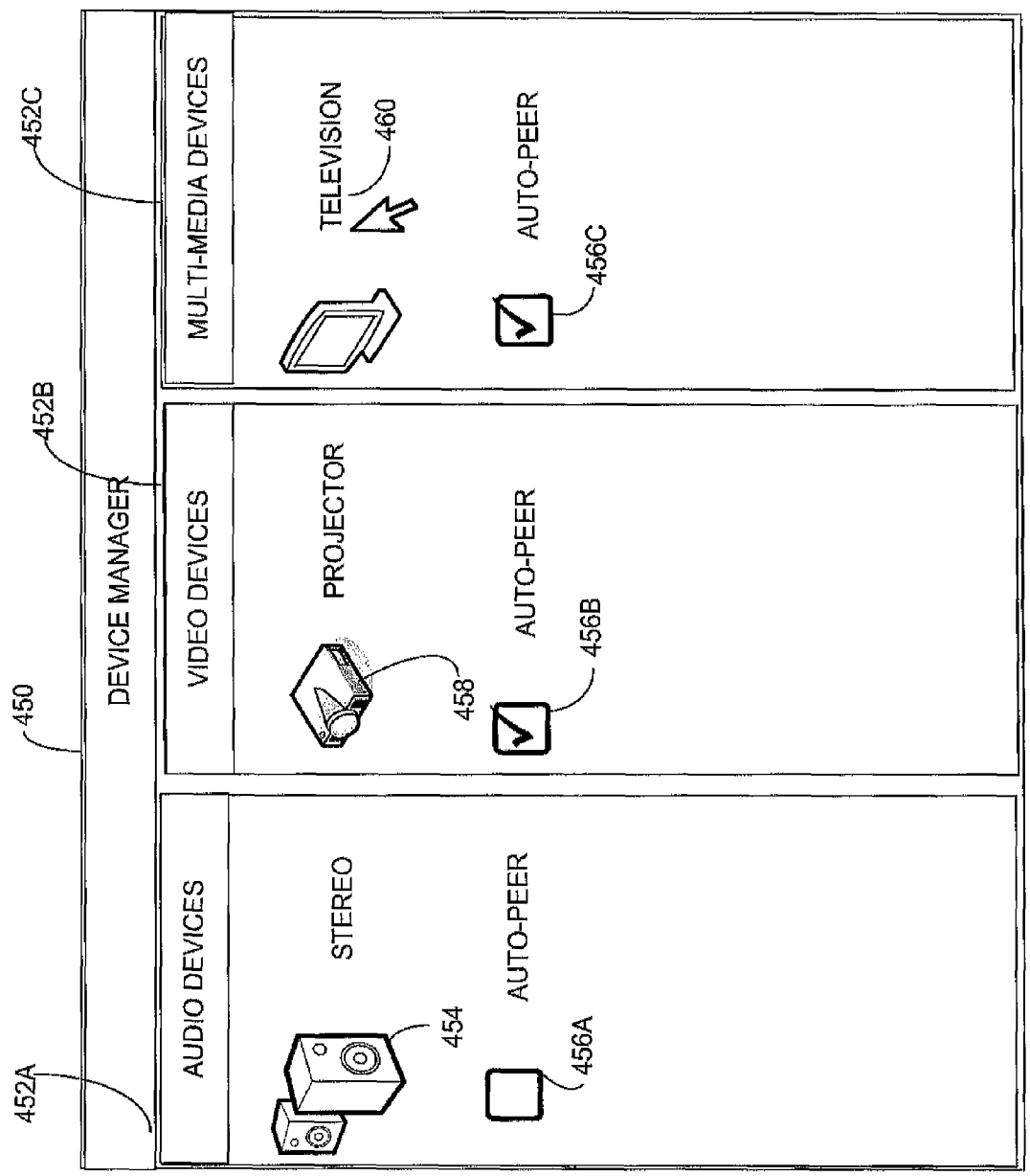
FIG. 4 is a graphical user interface through which a user may specify preferences for automatic formation of peer-to-peer connections with one or more devices in accordance with some embodiments of the invention.

Scenarios under which a wireless device automatically applies bootstrapping techniques to form a peer-to-peer connection may be based on any suitable factors. Those factors may include user preferences. FIG. 4 provides an example of a graphical user interface 450 through which a user may specify preferences. Graphical user interface 450, for example, may be presented by a device manager 330 (FIG. 3) or other suitable component executing on a computing device, such as computing device 150 (FIG. 1B). In the example of FIG. 4, user preferences are obtained based on device type. In the specific scenario illustrated preferences about audio/video device are obtained. Here, graphical user interface 450 includes display areas 452A, 452B and 452C, each displaying information about a type of device. As a specific example, display area 452A displays audio devices. Display area 452B displays video devices, and display area 452C displays multi-media devices. In each of the display areas, icons representing specific devices are illustrated. For example, display area 452A contains an icon 454 representing a stereo. Display area 452B contains an icon 458 representing a projector and display area 452C contains an icon 460 representing a television. These icons may represent specific devices that have been identified by the device manager or other suitable component executing on the computing device. Alternatively or additionally, these icons may represent classes of devices about which a user may express a preference.

In this example, the user preference relates to whether the computing device will automatically form a peer-to-peer connection with the specified devices, which may include bootstrapping such a connection through an access point, when possible. In this scenario, controls, such as controls 456A, 456B, and 456C are provided to receive user input expressing such preferences. In this example, control 456A is associated with icon 454. Control 456B is associated with icon 458, and control 456C is associated with icon 460. By selection of the control associated with an icon, a user may specify a preference for automatically forming a peer-to-peer connection with a device represented by the icon when the computing device determines that such a peer-to-peer connection will be beneficial in completing an operation. In the example of FIG. 4, the user has selected controls 456B and 456C, indicating a user preference for automatic formation of a peer-to-peer connector with a projector, of the type represented by icon 458 and a television, of the type represented by icon 460. Conversely, the user has indicated, based on the selections made through graphical user interface 450, that a peer-to-peer connection is not automatically formed to a stereo, such as represented by icon 454.

It should be recognized that FIG. 4 illustrates one example of a mechanism by which a user may express preferences for automatic formation of peer-to-peer connections. In this case, the preferences are expressed based on types of devices. In other embodiments, preferences may be expressed based on other criteria, such as the nature of information to be communicated over a peer-to-peer connection and/or an operating environment at the time the connection is to be formed. Further, it should be noted that in this example user input acts as a preference for both formation and automatic bootstrapping of the connection. Preferences about these matters could be obtained separately. Also, it should be recognized that it is not critical to the invention to condition the automatic formation of a peer-to-peer connection on user preferences. Accordingly, in some embodiments, user preferences may not be collected or applied.

Figure 5:
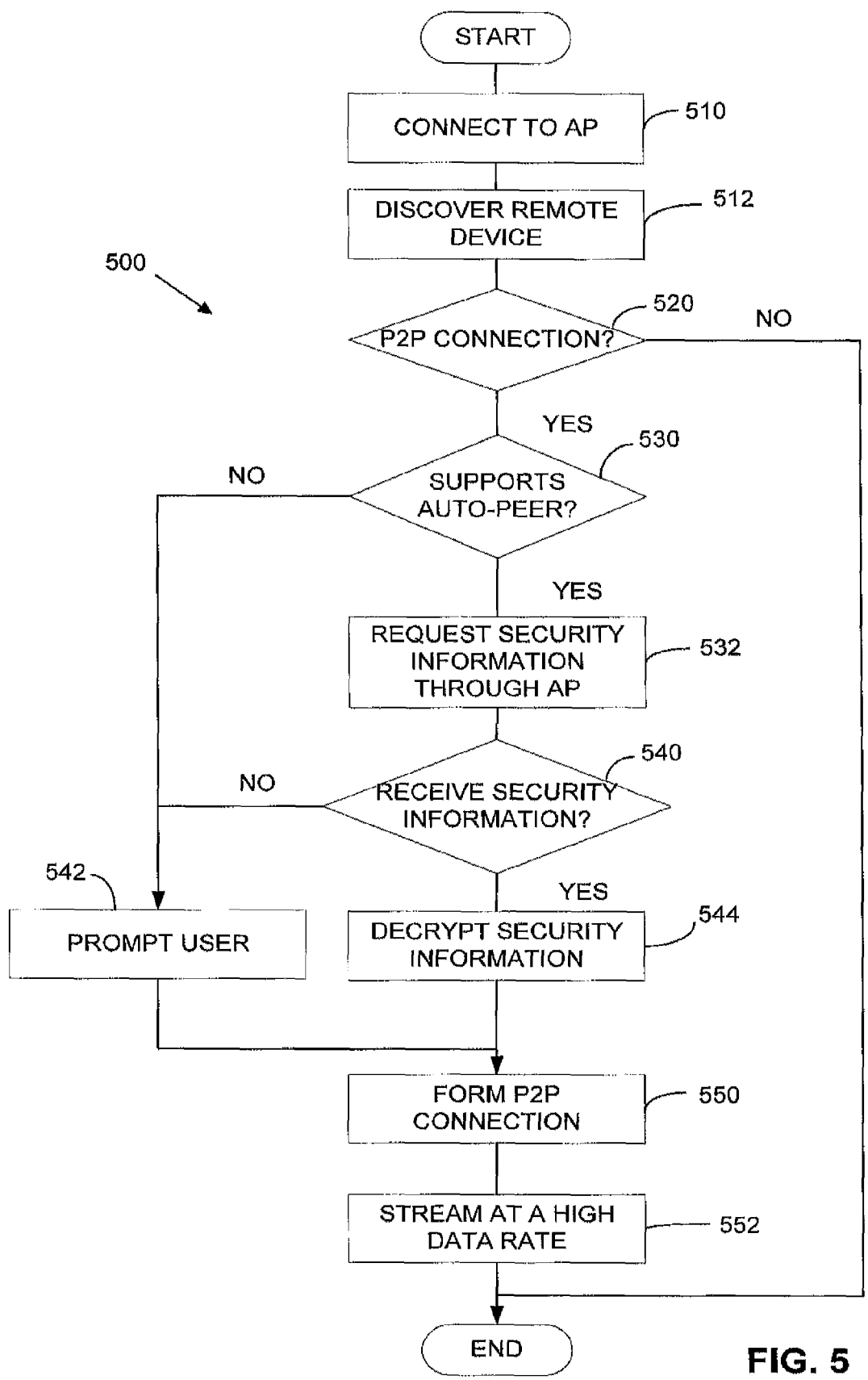
FIG. 5 is a flow chart illustrating a method of operation of a first wireless device that automatically forms a peer-to-peer connection.

Accordingly, regardless of whether of user preferences are collected, a wireless device may operate according to method 500, illustrated in FIG. 5, to automatically form a peer-to-peer connection using bootstrapping. Such a connection may be conditionally formed based on one or more criteria, including the suitability of an infrastructure mode connection for performing a desired operation.

Method 500 may be initiated at any suitable time in response to any suitable condition. For example, a first wireless device may implement method 500 in response to input indicating that an operation involving wireless communication is to be performed. In the example of FIG. 1B, that indication may come as a result of input from user 152. As a specific example, user input may indicate that computing device 150 is to stream audio/video data to a display device, such as display 160. However, the specific operation to be performed in not critical to the invention, and method 500 may be implemented as part of performing any suitable operation.

Regardless of the event that triggers execution of method 500, the method may be performed by operation of a component on the first wireless device. As a specific example, a device manager, such as device manager 330, may perform method 500 in response to a request received from an application component or any other suitable component executing on a wireless computing device. Though, it should be appreciated that the specific component that performs the acts of method 500 is not critical to the invention and any component or combination of components may perform the acts of method 500.

In the example of FIG. 5, method 500 begins at block 510. At block 510, a connection to an access point is established. In this example, the connection to the access point is shown to be established in response to an indication that an operation involving wireless communication is to be performed. Though, it should be recognized that a wireless device may form a connection to an access point in advance of needing to wirelessly communicate data. Accordingly, processing at block 510 may be performed at any suitable time, including in advance of other actions that are part of method 500.

Regardless of when the connection to the access point is established, such a connection may be formed in accordance with a standard protocol or any other suitable way. In some embodiments, the connection to an access point may be formed in accordance with an 802.11 protocol. Though, regardless of the protocol used, forming a connection may entail generating security information that allows the first wireless device and access point to encrypt communications.

Regardless of when and how the connection to the access point is established, method 500 may proceed to block 512. At block 512, the first wireless device executing method 500 may discover a second wireless device for performing the requested operation. In the example of FIG. 1B in which user 152 requests that computing device 150 stream audio/video data to a display, processing at block 512 may entail discovering a display 160 equipped for wireless communication in the vicinity of the wireless computing device 150. Though, it should be recognized that the type of device to be discovered may depend on the nature of the operation requested. The device to be discovered, for example, may be a purely audio device, a purely video device or may be a device that is unrelated to the rendering of audio/video information. For example, in scenarios in which the requested operation relates to data back up, the second wireless device to be discovered at block 512 may be a mass storage device.

Regardless of the nature of the device to be discovered, processing at block 512 may entail analyzing communications to identify a second wireless device that performs a service used in completing the requested operation. Those communications, in some embodiments, will come from the second wireless device that will be used in completing the operation. Though, it should be appreciated that it is not a requirement that a second wireless device be discovered based on communications it has itself sent. The communications, for example, may be sent by a proxy or other intermediary device.

Communications from remote devices received and analyzed at block 512 may be transmitted by those devices automatically. For example, a remote device providing a service may periodically transmit a beacon or other communication incorporating an advertisement for that service. Alternatively or additionally, such communications may be sent in response to an inquiry from the first wireless device executing method 500. As a specific example, processing at block 512 may entail transmission of a probe message or other inquiry type message that may prompt a remote device to respond.

Regardless of the specific communications received and/or sent at block 512, those communications may be exchanged in any suitable format. For example, the communications may be exchanged in accordance with a service discovery aspect of a peer-to-peer protocol used by the wireless devices. Alternatively or additionally, the communications may be exchanged in accordance with a service discovery protocol used on network 124.

Once a second wireless remote device that can be used in completing a requested operation is identified, method 500 may proceed to decision block 520. At decision block 520, the method may branch, depending on whether a peer-to-peer connection is to be formed. In the embodiment illustrated, the wireless computing device executing method 500 determines whether a peer-to-peer connection is to be formed for completion of the requested operation. The determination made at decision block 520 may depend on user preferences and/or other factors. In some embodiments, those other factors may include the nature of the operation and/or characteristics of the communication channels that may be formed. In some embodiments, the determination at block 520 may entail a comparison of a communication channel that may be formed through an access point or other infrastructure mode component to a communication channel that may be formed by a peer-to-peer connection. For example, a peer-to-peer connection may be selected when an infrastructure mode connection does not support a bandwidth requested to complete an operation.

As another example, the determination may be base don a predicted rate of information exchange being above a threshold. The predicted rate of information exchange may be determined based on a request from an application component requesting a communication channel or in any other suitable way.

Though, other factors may alternatively or additionally be applied at decision block 520. For example, the capabilities of the second wireless device discovered at block 512 may be considered at decision block 520. For example, no peer-to-peer connection may be formed if the second wireless device is not capable of forming a peer-to-peer connection or is not capable of bootstrapping a peer-to-peer connection through the access point.

Regardless of the criteria used at decision block 520, if no peer-to-peer connection is to be formed, the process may branch from decision block 520 to the end, without such a peer-to-peer connection being formed or used. If method 500 branches from decision block 520 to the end, the requested operation may be completed using communications through the access point.

Conversely, if, as a result of processing at decision block 520, a peer-to-peer connection is to be formed, method 500 proceeds to decision block 530. At decision block 530, method 500 may again branch, depending on whether the second wireless device discovered at block 512 supports automatic formation of a peer-to-peer connection. Processing at block 530 may be based on information received about the second wireless device. This information may be received in any suitable way. In some embodiments, the information indicating the capabilities of the second wireless device to automatically form a peer-to-peer connection may be provided in response to a discovery request. Accordingly, in the embodiment illustrated, processing at block 530 may entail applying device capability information received at block 512.

Regardless of where the information used to determine whether the second wireless device supports automatic formation of a peer-to-peer connection, if the device supports that capability, method 500 may proceed to block 532. At block 532, the first wireless computing device executing method 500 may request security information through an access point for pairing with the second wireless device. In some embodiments, the access point, or other suitable component on an infrastructure network to which the access point is connected, may store that security information and respond to the request sent at block 532. Though, in the embodiment illustrated, the request transmitted at block 532 is passed through the access point to the second wireless device discovered at block 512. The second wireless device then responds back through the access point with the security information first. In this way, communications between the access point and each of the wireless device and the second wireless device detected at block 512 are encrypted according to security established when each of those devices associated with the access point. Accordingly, though processing at block 532 may trigger wireless transmission of security information used for pairing the first and second wireless devices, that security information may be encrypted based on the protocol used by both the wireless devices for communicating through the access point.

Once the security information is requested, method 500 may proceed to decision block 540. At decision block 540, the method 500 may again branch, depending on whether the requested security information is received. If so, the method proceeds to block 544 where the security information is decrypted. In scenarios in which information received from the access point is encrypted according to the protocol used by the access point, processing at block 544 may entail decrypting a communication containing the security information for pairing with the second wireless device according to processing as is used on other types of communications received through the access point. Though, in other embodiments, the second wireless device and/or access point may be configured to use additional encryption or other security measures for security information used in forming a peer-to-peer connection.

Regardless of the specific encryption techniques for the security information, a corresponding decryption operation may be performed at block 544 to recover the security information. Method 500 may then proceed to block 550 where that recovered security information is applied to form a peer-to-peer connection. In the scenario illustrated, the security information may be applied in the same way as security information that, in a conventional process of forming a peer-to-peer connection, is input by a user. For example, the security information may represent a PIN for the second wireless device. That PIN may be used to exchange peer-to-peer communications with the second wireless device in accordance with the WPS protocol. Though, it should be recognized that the specific mechanism by which a peer-to-peer connection is formed is not critical to the invention, and the security information obtained through communications with the access point may be used in any suitable way.

Once the peer-to-peer connection is formed, it may be used to complete the requested operation. In this scenario illustrated in FIG. 5, the peer-to-peer connection has been formed in response to a request for an operation involving streaming data at a higher data rate than could be reliably supported using infrastructure mode communications through the access point. Accordingly, in this example, completion of the operation at block 542 entails streaming data at a high data rate using the peer-to-peer connection. That data, for example, may be audio/video data for rendering on a display device. Though, the specific type of data communicated over the peer-to-peer connection and its use is not critical to the invention.

In scenarios in which processing at decision block 520 determines that a peer-to-peer connection may provide a desirable user experience but that connection was not formed by bootstrapping through the access point, the user may be prompted to enter security information so that the peer-to-peer connection can be formed. Accordingly, FIG. 5 illustrates that when processing at decision block 530 determines that the detected remote device does not support automatic formation of a peer-to-peer connection, based on bootstrapping through method 500 branches from decision block 530 to block 542. At block 542, the user may be prompted to enter security information. Method 500 may then continue at block 550 the access point where the user-entered security information may be used instead of automatically received security information. Regardless of the manner in which the security information is obtained, the peer-to-peer connection may be formed at block 550 and used at block 552.

Similarly, even though a second wireless device indicates a capability to provide security information through an access, if security information is not received, method 500 may branch from decision block 500 to block 542. If processing reaches decision block 542, a user of the first wireless device may be prompted to provide the security information which, as described above, may be used at blocks 550 and 552 to form a peer-to-peer connection and complete the requested operation using that peer-to-peer connection.

Regardless in the manner in which the security information is obtained, once the peer-to-peer connection is formed and then used at blocks 550 and 552, method 500 may end. At the end of method 500, the peer-to-peer connection may remain in place. Alternatively, the peer-to-peer connection may be broken down. If the peer-to-peer connection is broken down upon completion of a requested operation, the connection may be formed again in response to a subsequent request for an operation. Though, it should be recognized that the manner in which a peer-to-peer connection is used is not critical to the invention, and any suitable action may be taken upon completion of method 500.

Figure 6:
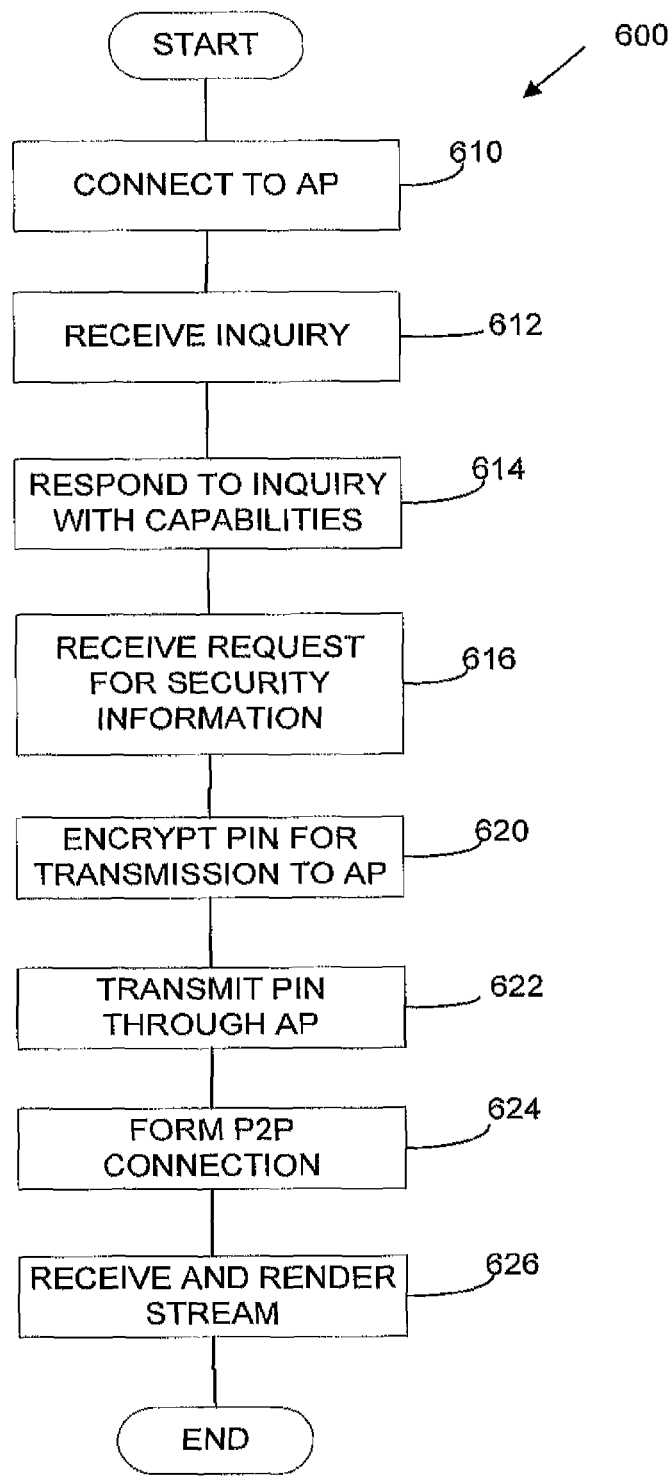
FIG. 6 is a flow chart of a method of operation of a second wireless device that automatically forms a peer-to-peer connection with the first wireless device executing the process illustrated in FIG. 5, in accordance with some embodiments of the invention.

Turning to FIG. 6, a method 600 is illustrated. Method 600 may be implemented by a second wireless device that will interact with the first wireless device to perform an operation involving wireless communication. The acts of method 600 may be controlled by any suitable component on that second wireless device. In some embodiments, the acts may be controlled by a device manager, such as device manager 330 (FIG. 3). Though, the acts may be controlled by any suitable component within the operating system or elsewhere of the second wireless device.

The method 600 may begin at any suitable time. In some embodiments, the method may begin when the second wireless device is powered on or otherwise activated such that it is available to receive communications from another wireless device. Though, the specific conditions under which the method 600 may begin may depend on the nature of the operations performed by the remote wireless device. Accordingly, it is not critical to the invention what triggers the method 600.

Regardless of when or how the method 600 is initiated, the method may begin at block 610. At block 610, the second wireless device may connect to an access point. In the example illustrated in FIG. 6, the second wireless device connects to the same access point as the first wireless device at block 510 (FIG. 5). However, it is not a requirement that the devices connect to the same access point. The devices, for example, may each connect to a different access point connected through a local area network or other suitable mechanism.

Connection to an access point at block 610 may be formed in accordance with any suitable protocol, including the protocols described above in connection with block 510 (FIG. 5).

Method 600 may then proceed to block 612. At block 612, the second wireless device may receive an inquiry. This inquiry may be an inquiry of the type described above as being transmitted at block 512 (FIG. 5). Such an inquiry may be received through the access point to which a connection was established at block 610 or may be received as part of a peer-to-peer protocol. Such an inquiry may indicate to the second wireless device that information on capabilities and/or services of the remote wireless device are being requested. In scenarios in which the inquiry is received through the access point, block 612 may follow processing at block 610 at which a connection to that access point is formed. In scenarios in which the inquiry is received as part of a peer-to-peer communication, processing at block 610 may precede or follow processing at block 612. Accordingly, it should be appreciated that the specific ordering of the processing blocks for methods 500 and 600 is not critical to the invention, and the processing may be performed in any suitable order.

Regardless of the mechanism by which an inquiry is received at block 612, the second wireless device may respond to the inquiry. The response may indicate capabilities of the second wireless device to perform a service requested by the first wireless device. Alternatively or additionally, the response may indicate capabilities of the second wireless device to provide security information through an access point to support bootstrapping of a peer-to-peer connection. This information may be communicated in any suitable way, including as an information element in a response in a control frame responding to the inquiry. The response may be transmitted in any suitable way. In some embodiments, the response may be transmitted through the same mechanism over which the inquiry is received. This response, for example, may be provided in accordance with the peer-to-peer protocol or may be provided as part of a communication transmitted through the access point.

Method 600 may then proceed to block 616. At block 616, the second wireless device may receive a request for security information. In the embodiment illustrated, the request may be received as part of a communication received through the access point. Though, it is not a requirement of the invention that the request be received through the access point, and the request may be received in any suitable way.

At block 620, the wireless device may encrypt security information for transmission to the access point. This information may include any suitable information used in forming the peer-to-peer connection. In some embodiments, the security information may be a PIN as is conventionally used in pairing wireless devices. The wireless device executing the method 600 may obtain the information encrypted at block 620 in any suitable way. As an example, a wireless device may be manufactured with security information, such as a PIN, encoded in non-volatile memory on the device.

Regardless of the manner in which the security information processed at block 620 is obtained, it may be encrypted for transmission to the access point. The encryption may employ techniques conventionally used for communication with the access point. Encryption at block 620, for example, may be based on security information generated as part of configuring the second wireless device for communication through the access point.

At block 622, the second wireless device may transmit the encrypted PIN through the access point. Such a transmission may use techniques as are known in the art for wireless communication between devices on the same local area network. The transmission, for example, may be addressed to the first wireless device that issued the query received at block 612. Any suitable addressing mechanism may be used to direct the transmission at block 622 appropriately.

Regardless of the manner in which the PIN is encrypted and then transmitted, it may be received by the first wireless device that may then use that information to form a peer-to-peer connect at block 624. Processing at block 624 may be performed using techniques as are known in the art. Though, rather than requiring a user to input a PIN, the first wireless device may use the PIN received as a result of the transmission at block 622 to form the peer-to-peer connection.

Once the peer-to-peer connection is established, the wireless devices executing methods 500 and 600 may communicate over the peer-to-peer connection. In the embodiment illustrated in FIG. 6, the peer-to-peer connection is used by the first wireless device executing method 500 to transmit a stream of audio/video data to the second wireless device executing the method 600. Accordingly, in the example of FIG. 6, method 600 includes block 626 at which the second wireless device receives and renders a stream of audio/video data. Though, it should be appreciated that the specific processing performed as part of method 600 using the peer-to-peer connection formed at block 624 may depend on the functionality of the second wireless device executing the method 600 in the overall system and which that device is being operated.

Following block 626, the method 600 is shown to end. At the end of method 600, the peer-to-peer connection formed at block 624 may be broken down and reformed later if further operations involving the second wireless device executing the method 600 are required. Though, it is not a requirement of the invention that the peer-to-peer connection end when the operation for which it was established is completed.

Figure 7:
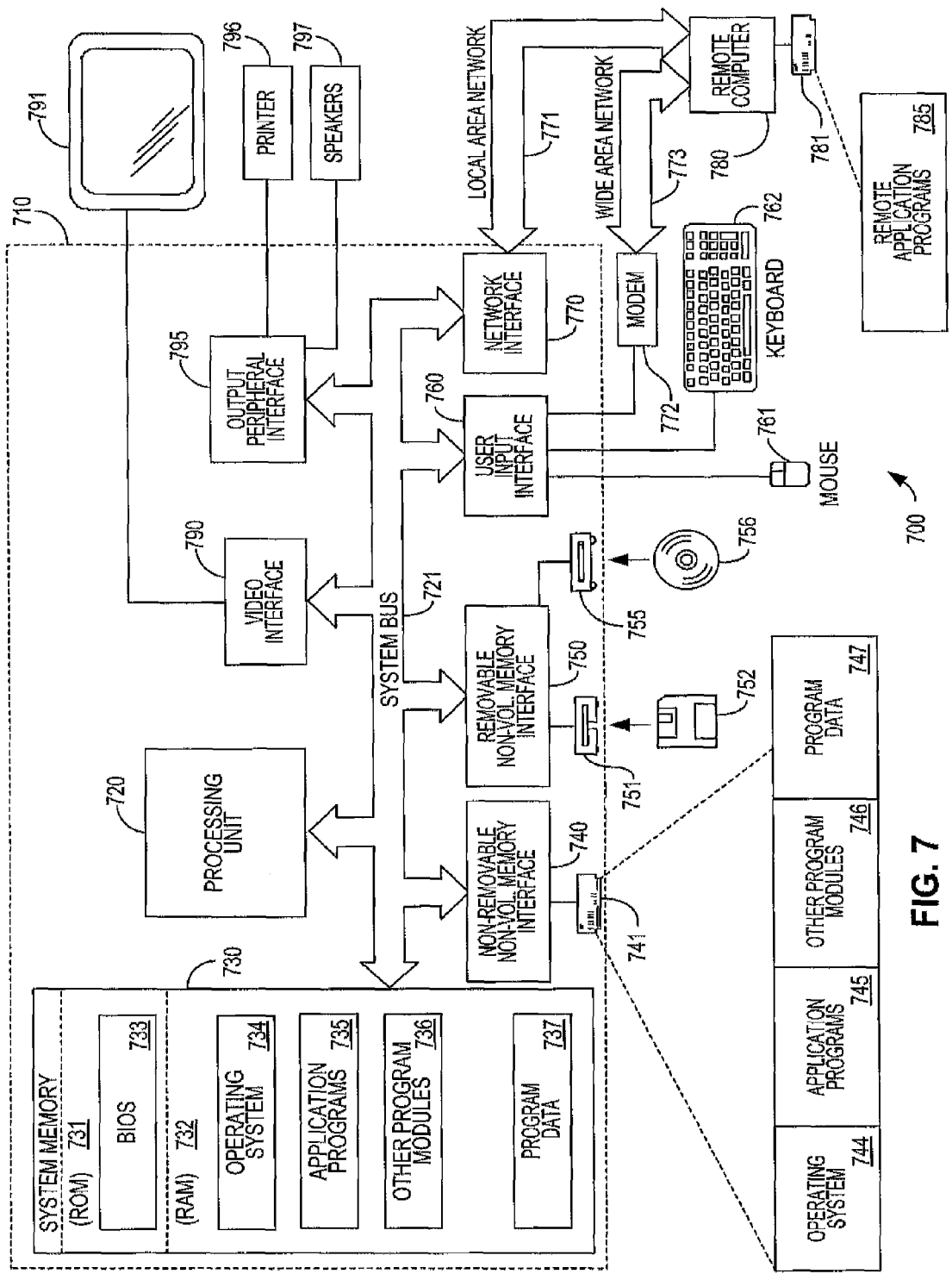
FIG. 7 is a sketch of an illustrative computing device in which some embodiments of the invention may be practiced.

FIG. 7 illustrates an example of a suitable computing system environment 700 on which the invention may be implemented. This computing system may represent either the first or second wireless devices performing method 500 or 600. The computing system environment 700 is only one example of a suitable computing environment and is not intended to suggest any limitation as to the scope of use or functionality of the invention. Neither should the computing environment 700 be interpreted as having any dependency or requirement relating to any one or combination of components illustrated in the exemplary operating environment 700.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The computing environment may execute computer-executable instructions, such as program modules. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 7, an exemplary system for implementing the invention includes a general purpose computing device in the form of a computer 710. Components of computer 710 may include, but are not limited to, a processing unit 720, a system memory 730, and a system bus 721 that couples various system components including the system memory to the processing unit 720. The system bus 721 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 710 typically includes a variety of computer readable media. Computer readable media can be any available media that can be accessed by computer 710 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 710. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 730 includes computer storage media in the form of volatile and/or nonvolatile memory such as read only memory (ROM) 731 and random access memory (RAM) 732. A basic input/output system 733 (BIOS), containing the basic routines that help to transfer information between elements within computer 710, such as during start-up, is typically stored in ROM 731. RAM 732 typically contains data and/or program modules that are immediately accessible to and/or presently being operated on by processing unit 720. By way of example, and not limitation, FIG. 7 illustrates operating system 734, application programs 735, other program modules 736, and program data 737.

The computer 710 may also include other removable/non-removable, volatile/nonvolatile computer storage media. By way of example only, FIG. 7 illustrates a hard disk drive 741 that reads from or writes to non-removable, nonvolatile magnetic media, a magnetic disk drive 751 that reads from or writes to a removable, nonvolatile magnetic disk 752, and an optical disk drive 755 that reads from or writes to a removable, nonvolatile optical disk 756 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 741 is typically connected to the system bus 721 through a non-removable memory interface such as interface 740, and magnetic disk drive 751 and optical disk drive 755 are typically connected to the system bus 721 by a removable memory interface, such as interface 750.

The drives and their associated computer storage media discussed above and illustrated in FIG. 7, provide storage of computer readable instructions, data structures, program modules and other data for the computer 710. In FIG. 7, for example, hard disk drive 741 is illustrated as storing operating system 744, application programs 745, other program modules 746, and program data 747. Note that these components can either be the same as or different from operating system 734, application programs 735, other program modules 736, and program data 737. Operating system 744, application programs 745, other program modules 746, and program data 747 are given different numbers here to illustrate that, at a minimum, they are different copies. A user may enter commands and information into the computer 710 through input devices such as a keyboard 762 and pointing device 761, commonly referred to as a mouse, trackball or touch pad. Other input devices (not shown) may include a microphone, joystick, game pad, satellite dish, scanner, or the like. These and other input devices are often connected to the processing unit 720 through a user input interface 760 that is coupled to the system bus, but may be connected by other interface and bus structures, such as a parallel port, game port or a universal serial bus (USB). A monitor 791 or other type of display device is also connected to the system bus 721 via an interface, such as a video interface 790. In addition to the monitor, computers may also include other peripheral output devices such as speakers 797 and printer 796, which may be connected through an output peripheral interface 795.

The computer 710 may operate in a networked environment using logical connections to one or more remote computers, such as a remote computer 780. The remote computer 780 may be a personal computer, a server, a router, a network PC, a peer device or other common network node, and typically includes many or all of the elements described above relative to the computer 710, although only a memory storage device 781 has been illustrated in FIG. 7. The logical connections depicted in FIG. 7 include a local area network (LAN) 771 and a wide area network (WAN) 773, but may also include other networks. Such networking environments are commonplace in offices, enterprise-wide computer networks, intranets and the Internet.

When used in a LAN networking environment, the computer 710 is connected to the LAN 771 through a network interface or adapter 770. When used in a WAN networking environment, the computer 710 typically includes a modem 772 or other means for establishing communications over the WAN 773, such as the Internet. The modem 772, which may be internal or external, may be connected to the system bus 721 via the user input interface 760, or other appropriate mechanism. In a networked environment, program modules depicted relative to the computer 710, or portions thereof, may be stored in the remote memory storage device. By way of example, and not limitation, FIG. 7 illustrates remote application programs 785 as residing on memory device 781. It will be appreciated that the network connections shown are exemplary and other means of establishing a communications link between the computers may be used.

Having thus described several aspects of at least one embodiment of this invention, it is to be appreciated that various alterations, modifications, and improvements will readily occur to those skilled in the art.

For example, various factors are described as impacting whether to bootstrap a peer-to-peer connection and/or to automatically form a peer-to-peer connection. Other factors may alternatively or additionally be used. For example, whether an access point to which either the first or second wireless device is connected provides encryption or other security for communications may be a further factor in determining whether to bootstrap a peer-to-peer connection through the access point.

Further, embodiments are described in which a request for security information is described as a separate transmission from a request for capabilities of a remote device to supply security information. In some embodiments, a single communication may be used for both of these purposes. A wireless device, for example, may respond to the request by supplying security information.

As yet another example, an access point is used as an example of a third device that facilitates the exchange of security information between a first wireless device and a second wireless device such that the first and second wireless devices may pair in accordance with a peer-to-peer protocol. As an example of another device that may act as a third device, a device that supports near field communication (NFC) may be used. Various examples of such devices are known, including devices that use low power RF transmissions and transport mechanisms that rely on line of sight, such as infrared (IR). Near field communication through the access point may be used to request and/or provide capability information and/or security information.

Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other non-transitory, tangible computer storage medium) encoded with one or more programs that, when executed on one or more computers or other processors, perform methods that implement the various embodiments of the invention discussed above. The computer readable storage medium or media can be transportable, such that the program or programs stored thereon can be loaded onto one or more different computers or other processors to implement various aspects of the present invention as discussed above. As used herein, the term "non-transitory computer-readable storage medium" encompasses only a computer-readable medium that can be considered to be a manufacture (i.e., article of manufacture) or a machine. Alternatively or additionally, the invention may be embodied as a computer readable medium other than a computer-readable storage medium, such as a propagating signal.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method of operating a first wireless device to form a peer-to-peer connection with a second wireless device, the method comprising:
   forming a connection with a third wireless device using a first connection mode;
   sending a first communication to a remote wireless device through the third wireless device via the connection formed using the first connection mode, the first communication requesting security information associated with the second wireless device;
   receiving a second communication from the second wireless device through the third wireless device via the connection formed using the first connection mode, the second communication comprising security information associated with the second wireless device; and
   forming a peer-to-peer connection with the second wireless device using a second connection mode that is different than the first connection mode, wherein the peer-to-peer connection is formed using the security information associated with the second wireless device.

2. The method of claim 1, wherein the third wireless device is an access point.

3. The method of claim 2, wherein:
   the method further comprises receiving from the access point an indication that the remote wireless device supports an exchange of security information through the access point;
   sending the first communication comprises encrypting the first communication in accordance with a security mechanism established with the access point; and
   receiving the second communication comprises decrypting the second communication in accordance with the security mechanism.

4. The method of claim 1, wherein the third wireless device communicates with the first wireless device and the second wireless device using near field communication (NFC).

5. The method of claim 1, further comprising:
   streaming audio/video data to the second wireless device over the peer-to-peer connection.

6. The method of claim 5, wherein the audio/video data is streamed to the second wireless device without user input to pair the first wireless device and the second wireless device.

7. The method of claim 1, further comprising:
   discovering the second wireless device through wireless communication with the second wireless device.

8. The method of claim 7, wherein:
   the peer-to-peer connection is formed in accordance with a peer-to-peer protocol;
   discovering the second wireless device through wireless communication with the second wireless device comprises:
      sending an inquiry in accordance with the peer-to-peer protocol; and
      receiving a response to the inquiry from the second wireless device.

9. A computer-readable storage medium comprising computer-executable instructions for controlling a wireless device and that, when executed:
   form an infrastructure mode connection with an access point;
   discover a remote wireless device;
   receive an indication of a capability of the remote wireless device to support exchange of security information through the access point;

conditionally form a peer-to-peer connection with the remote wireless device based on the capability of the remote wireless device, by:
  when the remote wireless device has the capability to support the exchange of security information:
    receiving security information through the access point via the infrastructure mode connection; and
    forming the peer-to-peer connection based on the received security information;
  when the remote wireless device does not have the capability to support the exchange of security information through the access point:
    receiving security information via user input; and
    forming the peer-to-peer connection based on the user-input security information.

10. The computer-readable storage medium of claim 9, wherein:
  the computer-executable instructions when executed are operable to discover the remote wireless device by communications through the access point.

11. The computer readable storage medium of claim 9, wherein:
  the computer-executable instructions when executed are operable to discover the remote wireless device by transmitting an inquiry scan communication.

12. The computer-readable storage medium of claim 9, wherein:
  forming the peer-to-peer connection based on the user-input security information comprises communicating with the remote wireless device in accordance with a Wi-Fi Protected Setup (WPS) protocol.

13. The computer-readable storage medium of claim 9, wherein:
  forming the peer-to-peer connection based on the exchanged security information comprises automatically forming the peer-to-peer connection without user input.

14. The computer-readable storage medium of claim 9, wherein the computer-executable instructions when executed are operable to:
  determine to form the peer-to-peer connection when a predicted rate of information exchange with the remote device is above a threshold.

15. A computer-readable storage medium comprising computer-executable instructions for controlling a first wireless device to form to form a peer-to-peer connection with a second wireless device, the computer-executable instructions, when executed, causing the first wireless device to perform operations comprising:
  forming a connection with a third wireless device using a first connection mode;
  sending a first communication to a remote wireless device through the third wireless device via the connection formed using the first connection mode, the first communication requesting security information associated with the second wireless device;
  receiving a second communication from the second wireless device through the third wireless device via the connection formed using the first connection mode, the second communication comprising security information associated with the second wireless device; and
  forming a peer-to-peer connection with the second wireless device using a second connection mode that is different than the first connection mode, wherein the peer-to-peer connection is formed using the security information associated with the second wireless device.

16. The computer-readable storage medium of claim 15, wherein the operations further comprise:
  streaming audio/video data to the second wireless device over the peer-to-peer connection.

17. The computer-readable storage medium of claim 16, wherein the audio/video data is streamed to the second wireless device without user input to pair the first wireless device and the second wireless device.

18. The computer-readable storage medium of claim 15, wherein the operations further comprise:
  discovering the second wireless device through wireless communication with the second wireless device.

19. The computer-readable storage medium of claim 18, wherein:
  the peer-to-peer connection is formed in accordance with a peer-to-peer protocol; and
  discovering the second wireless device through wireless communication with the second wireless device comprises:
    sending an inquiry in accordance with the peer-to-peer protocol; and
    receiving a response to the inquiry from the second wireless device.

20. The computer-readable storage medium of claim 15, wherein the operations further comprise:
  receiving from the third wireless device an indication that the remote wireless device supports an exchange of security information through the third wireless device;
  sending the first communication comprises encrypting the first communication in accordance with a security mechanism established with the third wireless device; and
  receiving the second communication comprises decrypting the second communication in accordance with the security mechanism.

* * * * *